3,062,893
FLUOROALKYLTHIOACETYLENES
John F. Harris, Jr., Wilmington, and Robert M. Joyce, Jr., Hockessin, Del., assignors to E. I. du Pont de Nemours and Company, Wilmington, Del., a corporation of Delaware
No Drawing. Filed Dec. 8, 1960, Ser. No. 74,466
13 Claims. (Cl. 260—609)

This invention relates to unsaturated organic compounds. More particularly, it relates to, and has as its chief objects provision of, certain novel acetylenic compounds and methods for the preparation of the same.

The novel products of this invention are the thioacetylenes of the formula $R_fSC{\equiv}CR$, wherein $R_f$ is a polyfluoroalkyl group, i.e., an alkyl group having more than one fluorine substituent, of up to 10 carbons and R is hydrogen, a monovalent hydrocarbon radical of up to 10 carbons, $R_fS$ or $R_f$. More specifically, the monovalent hydrocarbon radical can be alkyl, aryl, cycloalkyl, aralkyl, or alkaryl.

The polyfluoroalkylthioacetylenes of this invention can be prepared by reaction of a polyfluoroalkanesulfenyl halide, e.g., a polyfluoroalkanesulfenyl chloride, with an alkali metal or halomagnesium acetylide. The alkali metal and halomagnesium acetylides have the formula $XC{\equiv}CY$, wherein X is hydrogen, a monovalent hydrocarbon radical of up to 10 carbons, a polyfluoroalkyl radical of up to 10 carbons or Y. As in the definition of R, given above, monovalent hydrocarbon radicals include alkyl, cycloalkyl, aryl, aralkyl, and alkaryl radicals. Y in this formula is an alkali metal, i.e., lithium, sodium, potassium, rubidium, or cesium, or a halomagnesium group, the halogen of which has an atomic number of at least 17, i.e., —MgCl, —MgBr, or —MgI.

The reaction of the polyfluoroalkanesulfenyl halide with the alkali metal or halomagnesium acetylide is conveniently carried out by first preparing a solution of the alkali metal or halomagnesium acetylide in an ether as reaction medium, e.g., in diethyl ether, di-n-butyl ether, or dioxane, by conventional methods. For example, a diethyl ether solution of phenylethynylmagnesium bromide can be prepared by reaction of phenylacetylene with an ether solution of ethylmagnesium bromide (which in turn has been prepared by conventional methods). There is then added to the ether solution of the alkali metal or halomagnesium acetylide at least one mole of a polyfluoroalkanesulfenyl halide, e.g., trifluoromethanesulfenyl chloride, for each atom of alkali metal or each halomagnesium group in the acetylide being employed, and the reaction mixture is maintained at a temperature between —20 and +50° C., preferably between 0 and 25° C. for a few hours to obtain complete reaction. Usually 1–2 hours are sufficient, but reaction times of up to several days can be employed. The reaction mixture is then poured into a stirred mixture of ice and water, optionally containing a mineral acid, e.g., hydrochloric acid, to remove the alkali metal halide or magnesium halide by-product that is present. The organic layer is separated and combined with ether extractions of the aqueous layer, and then fractionally distilled after drying over a desiccant, such as anhydrous magnesium sulfate.

An alternative method for the preparation of some of the polyfluoroalkylthioacetylenes of this invention involves the reaction in the presence of ultraviolet light of a halogen of atomic number between 17 and 35, inclusive, i.e., chlorine or bromine, with a 1,2-bis(polyfluoroalkylthio)ethane of the formula $R_fSCH_2CH_2SR_f$, wherein $R_f$ is a polyfluoroalkyl group of up to 10 carbons, to form a dihalo-1,2-bis(polyfluoroalkylthio)ethane which is then dehydrohalogenated by treatment with an alkali metal hydroxide.

This alternative process is conveniently carried out by treating a 1,2-bis(polyfluoroalkylthio)ethane in which the polyfluoroalkyl groups contain not more than 10 carbon atoms each with at least two moles of chlorine or bromine for each mole of the fluoroalkylthioethane at a temperature between 0 and 100° C. in the presence of ultraviolet light. The use of a solvent or reaction medium in this process is not necessary, but, if desired, an inert solvent for the reactants can be used. Examples of suitable solvents include carbon tetrachloride, chloroform, and ethylene dichloride. It is very convenient to carry out the halogenation at the temperature at which the reaction mixtures refluxes.

Any convenient source of ultraviolet light can be employed. For example, sunlight, or commercial mercury arc sunlamps are suitable. Any irradiating device that generates light containing some radiation of ultraviolet or near-ultraviolet wavelengths, i.e., light of wavelengths between about 0.015 and 0.04 micron, can be used. The rate of reaction will of course depend on the intensity of the ultraviolet radiations reaching the reaction mixture and this will of course depend on the strength of the ultraviolet light source and its distance from the reaction vessel. Reaction times of several hours to several days are normally employed.

This halogenation reaction usually results in the formation of some monohalogenated products as well as a mixture of the various isomeric dihalogenated products. The monohalogenated products can be separated from the dihalogenated products by fractional distillation. It is not necessary to isolate the individual dihalogenated isomers since they all react with alkali metal hydroxide in the next step of the process to give the desired bis(polyfluoroalkylthio)acetylenes.

The dehydrohalogenation step of this process is conveniently carried out by contacting a dihalo-1,2-bis-(polyfluoroalkylthio)ethane obtained as described above with at least 2 moles of an alkali metal hydroxide, e.g., potassium hydroxide. A wide range of operating temperatures can be used in this process. Temperatures ranging between 40° C. and 200° C. are quite suitable. The dehydrohalogenation takes place rapidly at these temperatures. The use of an inert reaction medium is not essential in this process, since molten alkali metal hydroxide at a temperature of about 150° C. can be used. However, it is convenient to employ an inert medium. Dispersions of powdered alkali metal hydroxides in high boiling hydrocarbons are useful in this process. The polyfluoroalkylthioacetylenes obtained in the reaction should not, however, be exposed to the alkali metal hydroxide for especially long times as such exposure causes decomposition of the products. A stream of inert gas, e.g., nitrogen, passed through the reaction zone is a convenient way of removing the polyfluoroalkylthioacetylene from the reaction zone when an alkali metal hydroxide is used in the absence of any reaction medium. The polyfluoroalkylthioacetylene produced in the reaction can be isolated from the reaction mixture by conventional methods, e.g., by fractional distillation.

Polyfluoroalkanesulfenyl halides used as starting materials in the process of this invention can be prepared by known methods. For example, trifluoromethanesulfenyl chloride can be made by reaction of trifluoromethyl disulfide with chlorine as described by Haszeldine and Kidd in J. Chem. Soc. 1953, 3219. The alkali metal and halomagnesium acetylides can be prepared by reaction of the appropriate acetylene with an alkali metalalkyl or aryl, or alkylmagnesium halide by well known methods. The 1,2-bis(polyfluoroalkylthio)ethanes used as starting materials in the alternative process can be made by the photocatalyzed reaction of a vinyl polyfluoroalkyl sulfide with a polyfluoroalkanethiol as described in coassigned U.S. application Serial No. 58,910, filed September 28, 1960.

The products and process of this invention are illustrated in further detail by the following examples in which the proportions of ingredients are expressed in parts by weight unless otherwise specified.

EXAMPLE I

*Phenyl(Trifluoromethylthio)Acetylene*

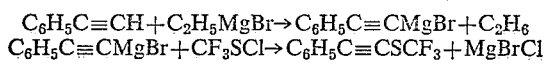

Ethylmagnesium bromide is prepared in conventional manner ("Organic Syntheses," vol. 36, p. 87) from 4.78 parts of magnesium and 16.7 parts of ethyl bromide in 36 parts of anhydrous diethyl ether. Twenty parts of phenylacetylene (0.196 mole) in 21 parts of anhydrous diethyl ether is added to the solution of the Grignard reagent and the mixture is refluxed for 0.5 hour. While the temperature of the mixture is maintained at 15–20° C. by external cooling, 26.6 parts of trifluoromethanesulfenyl chloride (0.195 mole) is added by means of a gas inlet tube, about 1 hour being required for this addition. The mixture is then poured into a stirred ice water-hydrochloric acid mixture. The product is removed by two extractions with 100 ml. portions of diethyl ether. The combined ether solution is washed twice with water, dried over anhydrous magnesium sulfate and distilled through a small Vigreux still. There is obtained 7.23 parts (24% of theory) of crude phenyl(trifluoromethylthio)acetylene boiling at 27–31° C./0.05 mm. and having a refractive index, $n_D^{25}$, of 1.5373. This product is combined with a similar fraction obtained by the method of Example II and redistilled through a small spinning band still. A fraction distilling at 32° C./0.40 mm., $n_D^{25}$=1.5213, is analyzed.

*Analysis.*—Calc'd for $C_9H_5F_3S$: F, 28.2%; S, 15.8%. Found: F, 27.2%; S, 15.7%.

EXAMPLE II

*Phenyl(Trifluoromethylthio)Acetylene*

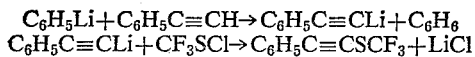

To approximately 30 parts of a diethyl ether solution of phenyllithium containing 4.12 parts of phenyllithium at 10° C. is added 5 parts of phenylacetylene dropwise. After the addition is completed (about 30 minutes being required), the mixture is stirred at 10° C. for 0.5 hour. To this reaction mixture, there is then added 10 parts of trifluoromethanesulfenyl chloride over a period of one hour. After being stirred for an additional hour, the reaction mixture is flooded with water. Thirty-six parts of diethyl ether is added to the reaction mixture and the ether layer is separated, washed twice with water, and dried over anhydrous magnesium sulfate. Upon distillation of this ether solution through a small Vigreux still there is obtained 1.5 parts of crude phenyl(trifluoromethylthio) acetylene distilling at 32–45° C./0.65 mm. and having a refractive index, $n_D^{25}$, of 1.5373.

EXAMPLE III

*Bis(Trifluoromethylthio)Acetylene*

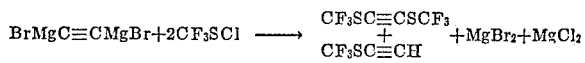

A n-butyl ether solution of a Grignard reagent is prepared by placing 36.5 parts of magnesium in 1000 parts of n-butyl ether and adding 163.5 parts of ethyl bromide with stirring. Acetylene, purified by bubbling through concentrated sulfuric acid and dried by passing through a soda-lime tower, is passed into this Grignard solution for 6 hours at approximately room temperature (25–30° C.). Some heat is evolved during the reaction and a fine precipitate is formed. Then, while continuing the stirring, 204 parts (1.5 mole) of trifluoromethanesulfenyl chloride is gradually passed into the reaction mixture at room temperature (90 minutes being required). The reaction mixture is cooled by a water bath to keep the temperature at 25° C. A trap cooled to —80° C. is attached to the reaction vessel to collect any unreacted trifluoromethanesulfenyl chloride, but only a trace is collected. After standing two days at room temperature the reaction mixture is filtered and distilled quickly, a fraction distilling at 30–135° C. being collected. Redistillation of this fraction gives 13.0 parts (B.P. 30–35° C. mostly 32° C.) which is found by vapor phase chromatography to be a mixture of trifluoromethylthioacetylene and bis(trifluoromethyl)disulfide. Nuclear magnetic resonance spectroscopy (both F and H) indicates the presence of trifluoromethylthioacetylene in a cut purified by preparative scale gas chromatography. Another fraction, B.P. 79–82° C., amounting to 11.22 parts and having a refractive index, $n_D^{25}$, of 1.4102 contains bis(trifluoromethylthio)acetylene.

EXAMPLE IV

*Bis(Trifluoromethylthio)Acetylene*

$$CF_3SCH_2CH_2SCF_3 + Br_2 \xrightarrow{h\nu} CF_3SCH_2CHBrSCF_3 +$$

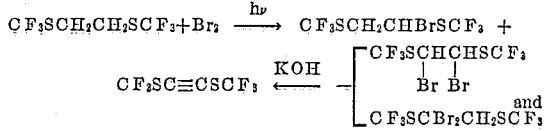

A mixture of 60 parts of 1,2-bis(trifluoromethylthio) ethane, 106 parts of bromine and 240 parts of carbon tetrachloride is heated to reflux in a glass reaction vessel and irradiated with a commercial sunlamp for a period of 3 days. Upon distillation of the reaction mixture through a spinning band still there is obtained 35.3 parts (44% of theory) of 1-bromo-1,2-bis(trifluoromethylthio)ethane distilling at 75° C./77 mm., $n_D^{25}$=1.4226, and 43 parts (43% of theory) of dibromo-1,2-bis(trifluoromethylthio) ethane distilling at 59° C./7 mm., $n_D^{25}$=1.4599.

*Analysis.*—Calc'd for $C_4H_3BrF_6S_2$: Br, 25.8%; F, 26.9%. Found: Br, 25.9%; F, 26.7%.

*Analysis.*—Calc'd for $C_4H_2Br_2F_6S_2$: Br, 41.2%; F, 29.4%. Found: Br, 41.9%; F, 29.4%.

An examination of the fluorine and proton nuclear magnetic resonance patterns of the dibromo fraction indicates the presence of two compounds in comparable amounts. Thus, both possible dibromo compounds, viz., 1,2-dibromo-1,2-bis(trifluoromethylthio)ethane and 1,1-dibromo-1,2-bis(trifluoromethylthio)ethane are formed during the bromination reaction.

Fifty parts of potassium hydroxide (minimum assay 85%) is heated in a reaction flask surrounded by an oil bath and fitted with a dropping funnel, a gas inlet tube, and an exit tube which leads to a trap cooled with a mixture of solid carbon dioxide and acetone. A slow stream of nitrogen is passed through the gas inlet tube and the oil bath is heated to about 150° C. At this temperature the potassium hydroxide becomes liquid and during a period of 0.5 hour 10 parts of dibromo-1,2-bis(trifluoromethylthio)ethane (prepared as described in the previous paragraph) is added dropwise. At the end of the addition, the material in the cold trap is distilled and there is obtained 3.06 parts (52% of theory) of bis(trifluoromethylthio) acetylene distilling at 84–86° C., $n_D^{25}$=1.3930–1.3935.

*Analysis.*—Calc'd for $C_4F_2S_2$: F, 50.3%; S, 28.4%. Found: F, 50.4%; S, 28.4%.

The fluorine nuclear magnetic resonance pattern obtained on this compound consists of a single resonance at —1288 c.p.s. (relative to the fluorine resonance of trifluoroacetic acid). The infrared absorption spectrum obtained on this product is quite simple, containing strong absorption in the 8–9 micron region (C—F) and a peak at 13.2 microns (S—$CF_3$).

EXAMPLE V

*Trifluoromethylthiopentafluoroethylthioacetylene*

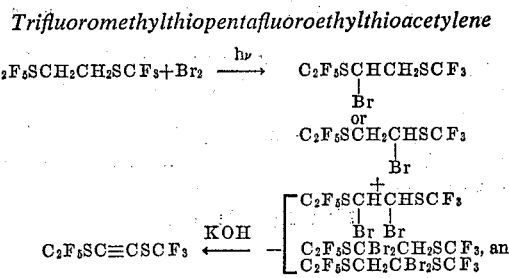

The bromination of 14.9 parts of 1-trifluoromethylthio-2-pentafluoroethylthioethane by the procedure described in Example IV for the bromination of 1,2-bis(trifluoromethylthio)ethane leads to the formation of a monobromo fraction (B.P. 54–59° C./25 mm., $n_D^{25}=1.4013$) and 6.75 parts of dibromo-1-trifluoromethylthio-2-pentafluoroethylthioethane boiling at 82–85° C./25 mm., $n_D^{25}=1.4373$. This dibromo fraction is believed to be a mixture of the three possible isomers (illustrated by above equation).

Dibromo-1-trifluoromethylthio - 2 - pentafluoroethylthioethane (5.8 parts) prepared as described in the preceding paragraph is dehydrobrominated by the procedure used in Example IV for the dehydrobromination of dibromo-1,2-bis(trifluoromethylthio)ethane. Distillation of the contents of the cold trap through a microstill yields 1.23 parts (34% of theory) of trifluoromethylthiopentafluoroethylthioacetylene distilling at 100–106° C. and having a refractive index, $n_D^{25}$, of 1.3797–1.3804.

*Analysis.*—Calc'd for $C_5F_8S_2$: F, 55.0%; S, 23.2%. Found: F, 53.8%; S, 22.7%.

EXAMPLE VI

*Phenyl(Chlorodifluoromethylthio)Acetylene*

$C_6H_5C\equiv CH+C_2H_5MgBr\rightarrow C_6H_5C\equiv CMgBr+C_2H_6$
$C_6H_5C\equiv CMgBr+ClCF_2SCl\rightarrow$
$\qquad\qquad\qquad\qquad C_6H_5C\equiv CSCF_2Cl+MgBrCl$ A solution of phenylethynylmagnesium bromide is prepared as described in Example I and to this solution, cooled in an ice water bath, is added 31 parts of chlorodifluoromethanesulfenyl chloride during one hour. The mixture is poured into a large excess of ice water and the crude product is removed by two extractions with 71 parts of ether. After being dried over anhydrous magnesium sulfate, the ether solution is distilled through a small Vigreux still. There is obtained 12.4 parts of crude product distilling at 44° C./0.25 mm. to 74° C./0.57 mm. Redistillation of this material through a small spinning band still yields 4.9 parts of phenyl(chlorodifluoromethylthio)acetylene distilling at 49° C./0.50 mm. to 51° C./0.60 mm., $n_D^{25}=1.5587$.

*Analysis.*—Calc'd for $C_9H_5ClF_2S$: C, 49.4%; H, 2.3%; F, 17.4%. Found: C, 49.5%; H, 2.4%; F, 16.7%.

The examples have illustrated the products and process of this invention by specific reference to certain polyfluoroalkylthioacetylenes. However, this invention includes any polyfluoroalkylthioacetylene of the formula $R_fSC\equiv CR$, wherein $R_f$ and R have the meanings defined hereinbefore. Examples of other products of this invention include the compounds listed in the third column of the following Table I. The specific polyfluoroalkylsulfenyl halides and alkali metal or halomagnesium acetylides used in preparing these are listed in the first two columns of the table.

TABLE I

| Reactants | | Polyfluoroalkylthioacetylene |
|---|---|---|
| $CF_3SBr$ | $CH_3C\equiv CMgI$ | $CH_3C\equiv CSCF_3$ |
| $n-C_3F_7SCl$ | $n-C_4H_9C\equiv CMgBr$ | $C_4H_9C\equiv CSC_3F_7$ |
| $(CF_3)_2CFSCl$ | 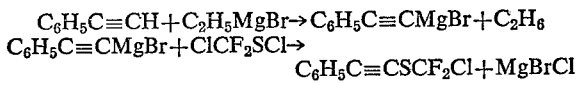 | |
| $CF_3(CF_2)_3SCl$ | $C_6H_5CH_2C\equiv CNa$ | $C_6H_5CH_2C\equiv CS(CF_2)_3CF_3$ |
| $CF_3(CF_2)_8SCl$ | $CH_3C_6H_4C\equiv CRb$ | $CH_3C_6H_4C\equiv CS(CF_2)_8CF_3$ |
| $CF_3(CF_2)_{11}SCl$ | $BrMgC\equiv CMgBr$ | $CF_3(CF_2)_{11}SC\equiv CS(CF_2)_{11}CF_3$ |
| $HCFClCF_2SCl$ | $C_2H_5C\equiv CMgI$ | $C_2H_5C\equiv CSCF_2CHFCl$ |
| $HCF_2CF_2SCl$ | $HC\equiv CMgCl$ | $HC\equiv CSCF_2CHF_2$ |
| $HCF_2CHFSCl$ | | |
| $ClCF_2CF_2SCl$ | $CF_3C\equiv CMgBr$ | $CF_3C\equiv CSCF_2CF_2Cl$ |
| $ClCF_2CH_2SCl$ | $C_2H_5C\equiv CMgBr$ | $C_2H_5C\equiv CSCH_2CF_2Cl$ |

The fluoroalkylthioacetylenes of this invention are useful for various purposes. Thus they are useful as solvents for polymers. Such solutions may be used for applying the polymer to wood, paper, etc. For example, samples of paper are waterproofed by immersion in a 10% solution of vinyl trifluoromethyl sulfide polymer in bis(trifluoromethylthio)acetylene at reflux followed by air drying. In a similar manner samples of wood and paper are waterproofed by immersion in a 10% solution of low molecular weight tetrafluoroethylene polymer (M.P. 83–145°) in bis(trifluoromethylthio)acetylene at reflux followed by air drying. Also a sample of paper is waterproofed by immersion in a 10% solution of vinyl trifluoromethyl sulfide polymer in phenyltrifluoromethylthioacetylene at about 100° followed by drying in a vacuum oven.

Since obvious modifications and equivalents in the invention will be evident to those skilled in the chemical arts, we propose to be bound solely by the appended claims.

The embodiments of the invention in which an exclusive property or privilege is claimed are defined as follows:

1. A fluoroalkylthioacetylene of the formula $R_fSC\equiv CR$ wherein $R_f$ is a polyfluoroalkyl group of up to 10 carbons and R is selected from the group consisting of hydrogen, monovalent hydrocarbon of up to 10 carbons, $R_fS$, and $R_f$.

2. Phenyl(trifluoromethylthio)acetylene.

3. Bis(trifluoromethylthio)acetylene.

4. Trifluoromethylthiopentafluoroethylthioacetylene.

5. Phenyl(chlorodifluoromethylthio)acetylene.

6. The process which comprises reacting a polyfluoroalkanesulfenyl halide with a compound of the formula $XC\equiv CY$, wherein Y is selected from the group consisting of the alkali metals and halomagnesium, and X is selected from the group consisting of hydrogen, monovalent hydrocarbon of up to 10 carbons, polyfluoroalkyl of up to 10 carbons and Y.

7. The process which comprises reacting a phenylethynylmagnesium halide with a trifluoromethanesulfenyl halide.

8. The process which comprises reacting phenylethynylmagnesium bromide with trifluoromethanesulfenyl chloride.

9. The process which comprises reacting lithium phenylacetylide with trifluoromethanesulfenyl chloride.

10. The process which comprises reacting an ethynylenedimagnesium halide with a trifluoromethanesulfenyl halide.

11. The process which comprises reacting ethynylenedimagnesium bromide with trifluoromethanesulfenyl chloride.

12. The process which comprises reacting a phenylethynylmagnesium halide with a chlorodifluoromethanesulfenyl halide.

13. The process which comprises reacting phenylethynylmagnesium bromide with chlorodifluoromethanesulfenyl chloride.

No references cited.